April 15, 1941.  N. KNAUS  2,238,796
OVEREDGE SEWING MACHINE
Filed June 10, 1939  11 Sheets-Sheet 1

Inventor
Nicholaus Knaus
By Henry J Miller
Attorney

Witness:
John N. Cave

April 15, 1941.　　　　N. KNAUS　　　　2,238,796
OVEREDGE SEWING MACHINE
Filed June 10, 1939　　　11 Sheets-Sheet 3

Inventor
Nicholaus Knaus

Witness:
John H. Cave

By Henry J Miller
Attorney

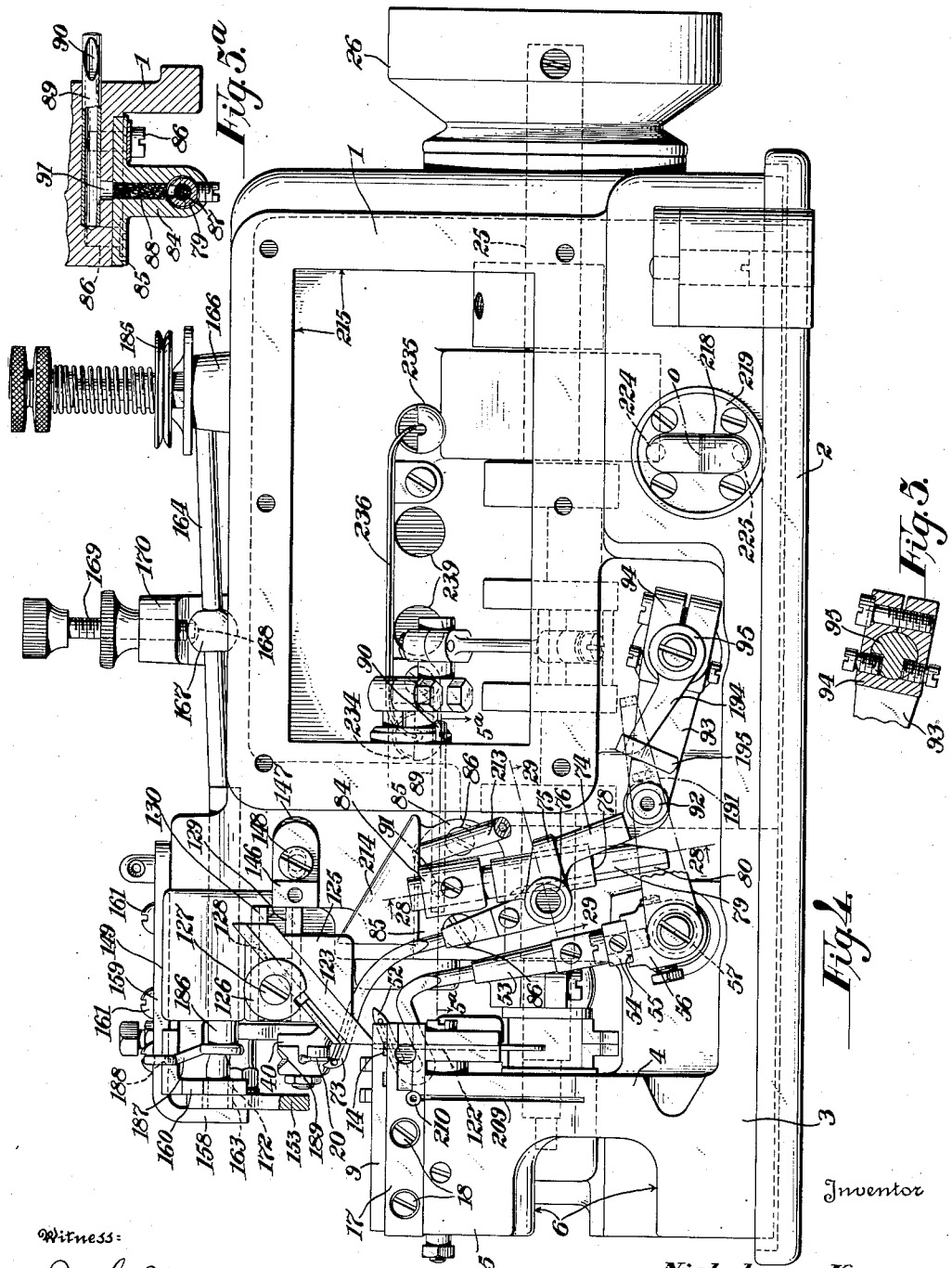

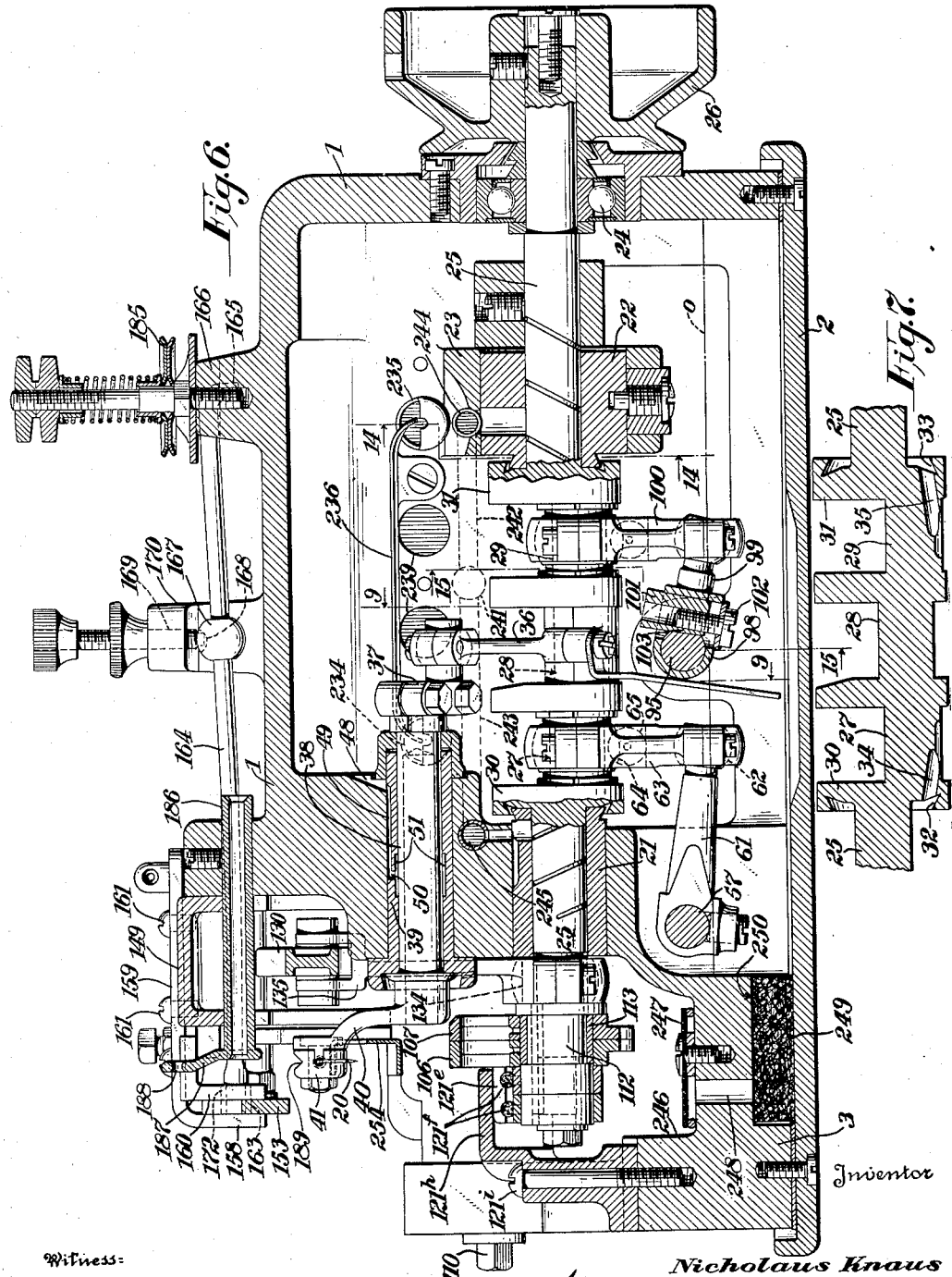

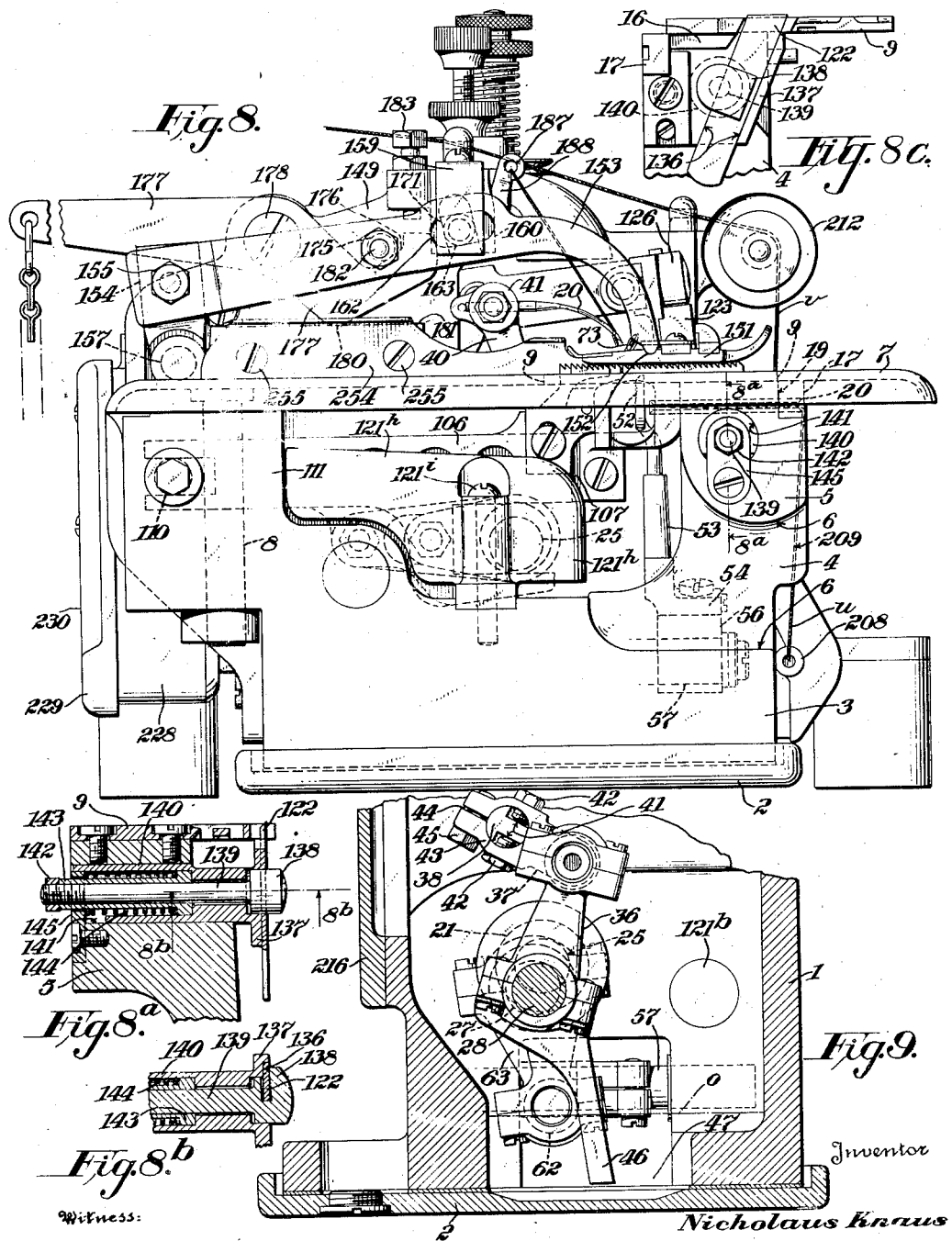

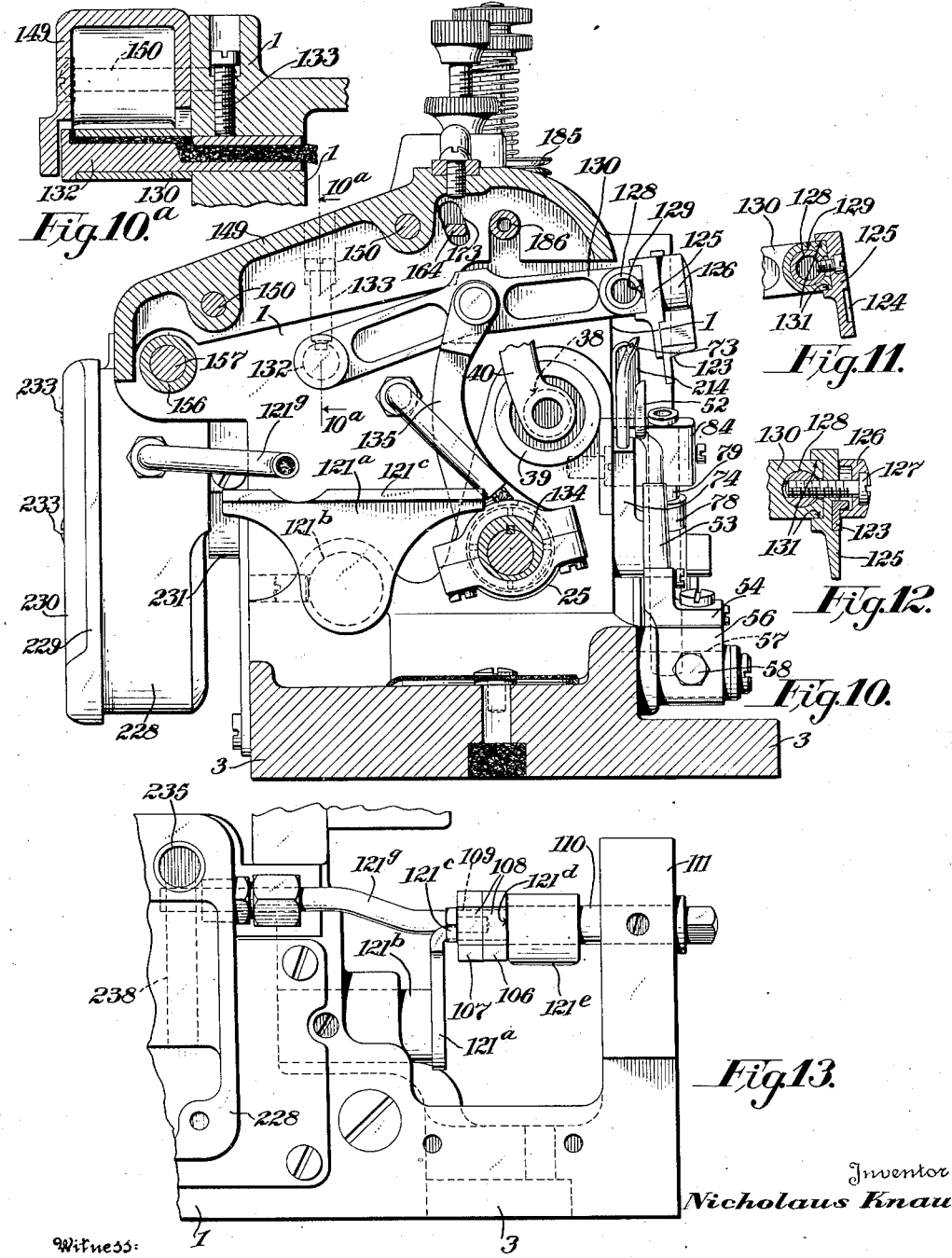

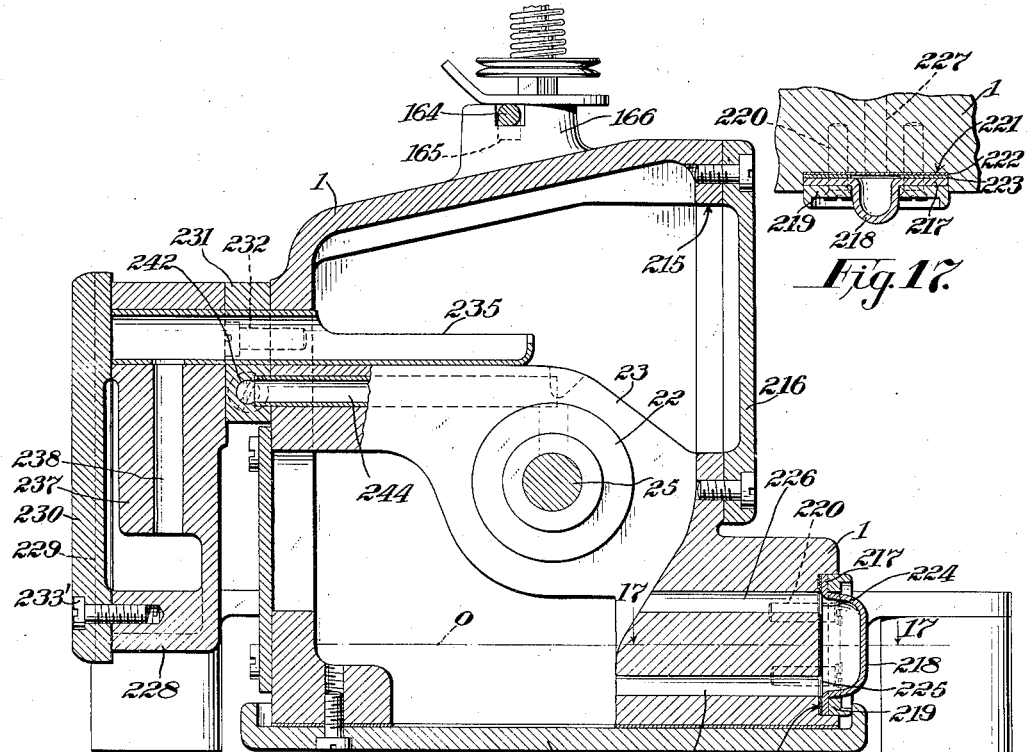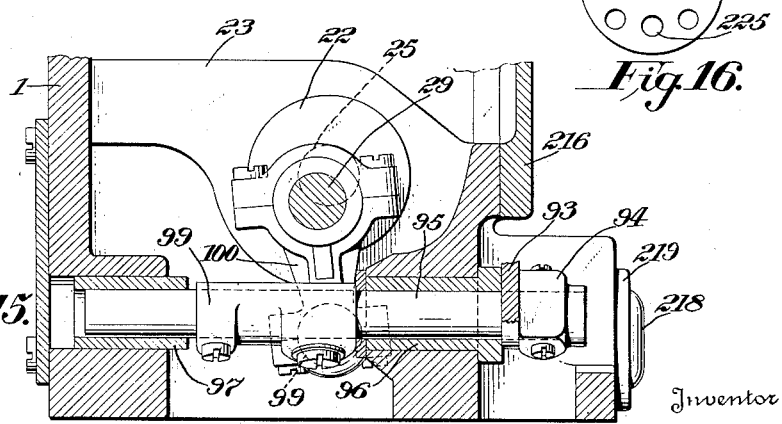

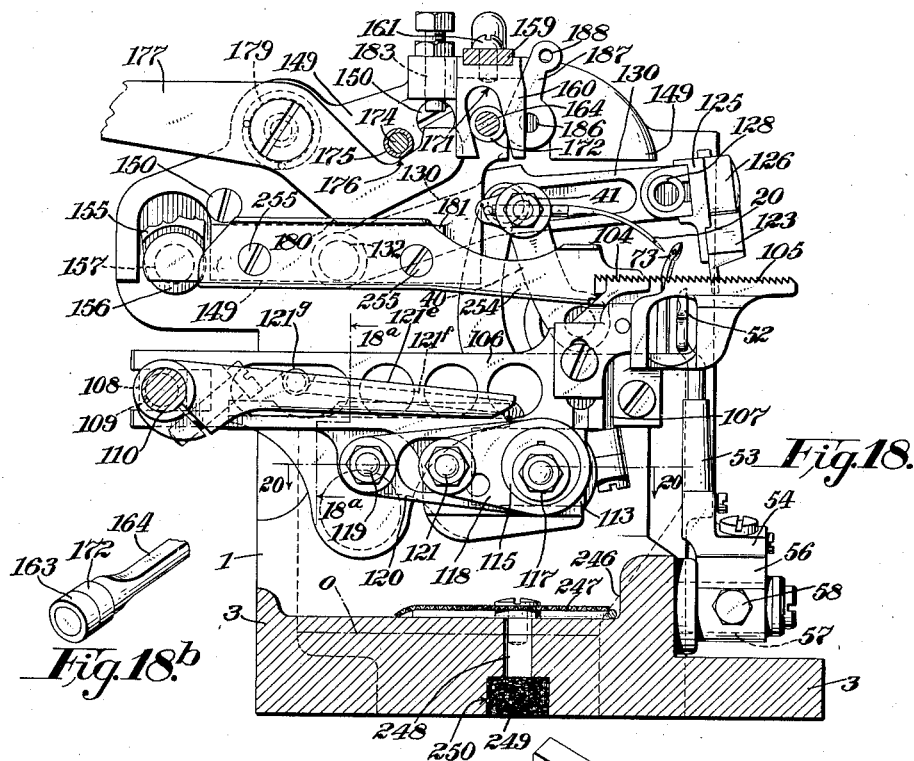

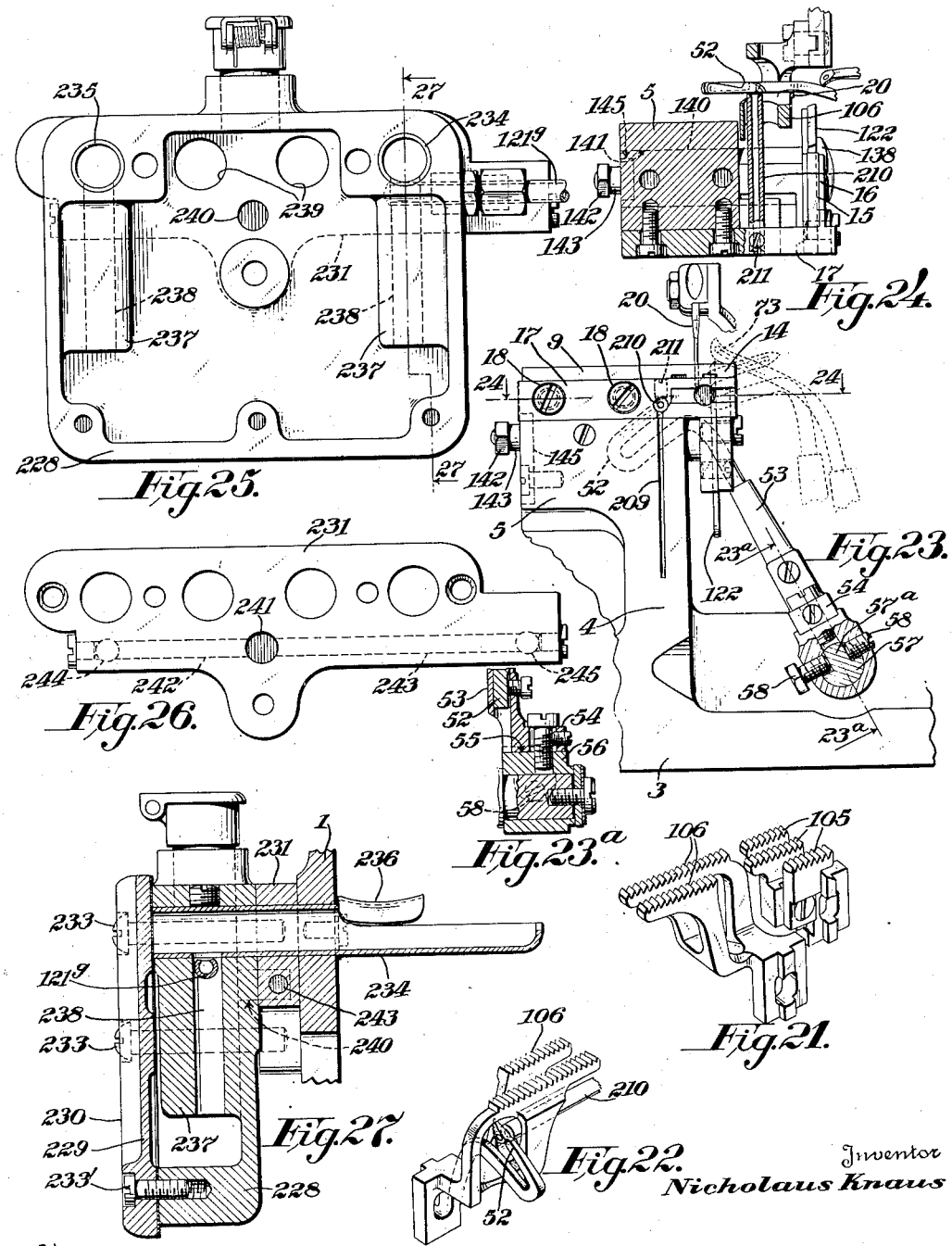

April 15, 1941.　　　　N. KNAUS　　　　2,238,796
OVEREDGE SEWING MACHINE
Filed June 10, 1939　　　11 Sheets-Sheet 11

Inventor
Nicholaus Knaus

Witness:
John H. Cave

By Henry J. Miller
Attorney

Patented Apr. 15, 1941

2,238,796

UNITED STATES PATENT OFFICE 2,238,796

OVEREDGE SEWING MACHINE

Nicholaus Knaus, Newark, N. J., assignor to The Singer Manufacturing Company, Elizabeth, N. J., a corporation of New Jersey Application June 10, 1939, Serial No. 278,393

10 Claims. (Cl. 112—162)

This invention relates to sewing machines of the overedge stitching type using a needle, an under or needle-loop-taking looper and an overedge looper, all coordinated to sew an overseam encompassing an edge of material presented to the machine.

An object of the invention is to provide such a machine with operating mechanism which is quiet running, wear resisting, and free from objectionable vibration and which does not interfere with the use of the machine in overseaming circular edges presented at the ends of tubular articles, as in blindstitch-hemming the ends of trousers legs.

A further object of the invention is to provide an overedge sewing machine the stitch-forming elements of which are individually crank-driven and do not interfere with the handling of endless work, such as tube-end operations, where the stitched work which has passed under the presser-foot must be brought back under a work-supporting horn and represented to the sewing machine needle to complete the operation. In no other overedge sewing machine with individually crank-driven stitch-forming elements with which I am familiar, can this be done, as the mechanism encroaches upon the space required for the passage of endless work back to the needle.

With the above and other objects in view, as will hereinafter appear, the invention comprises the devices, combinations, and arrangements of parts hereinafter set forth and illustrated in the accompanying drawings of a preferred embodiment of the invention, from which the several features of the invention and the advantages attained thereby will be readily understood by those skilled in the art.

Figure 1:
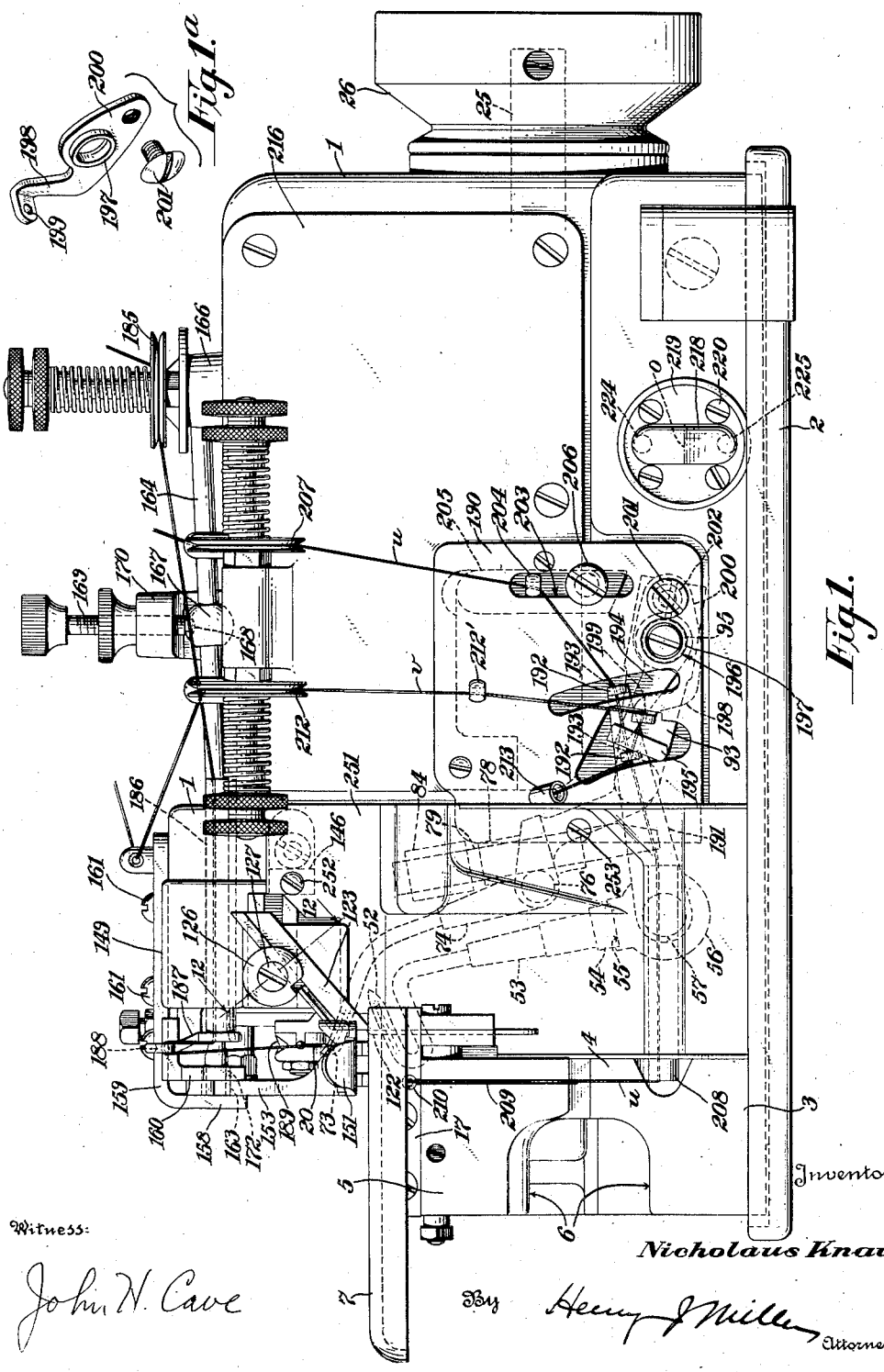
Figure 2:
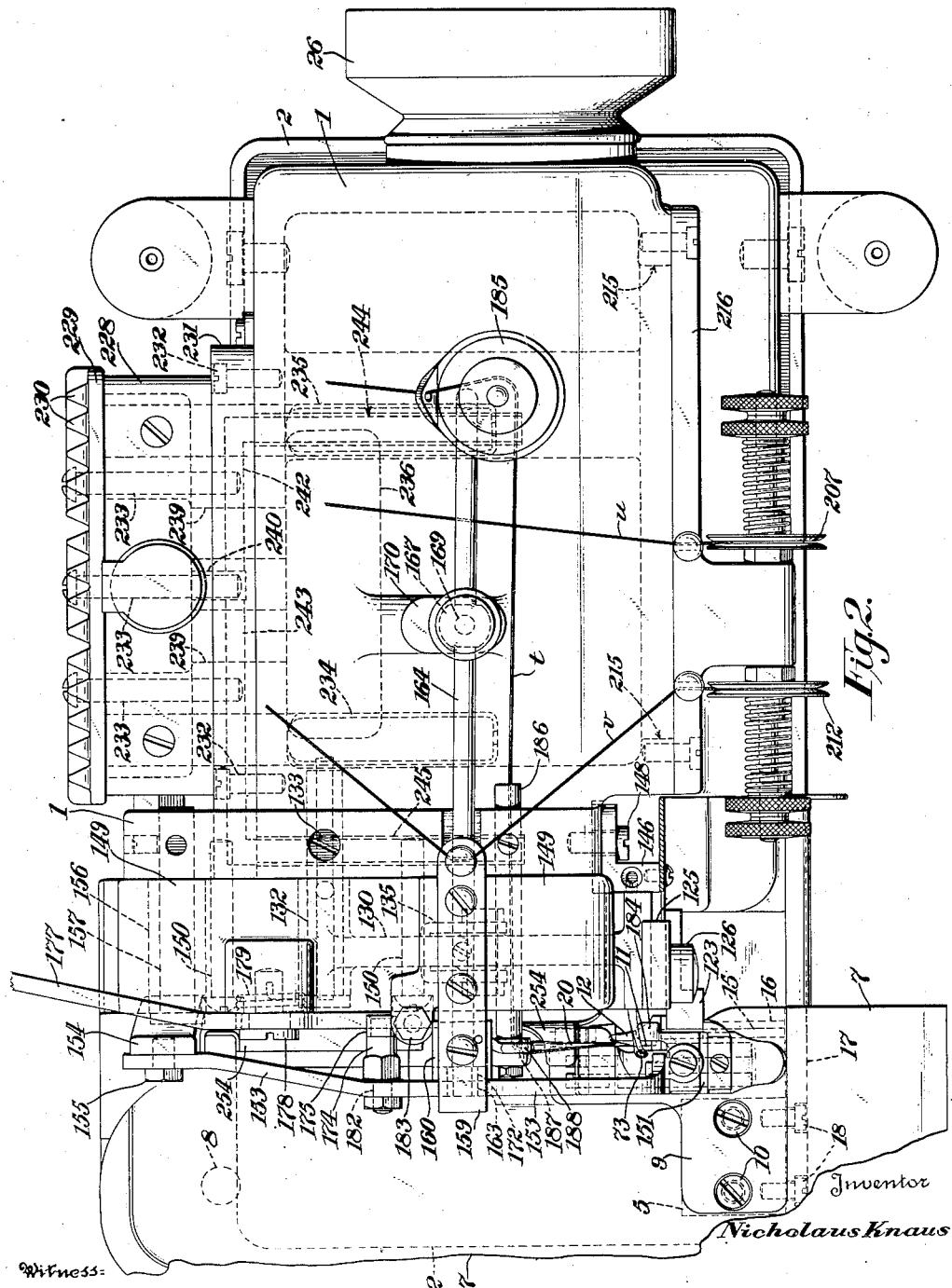
Figure 3:
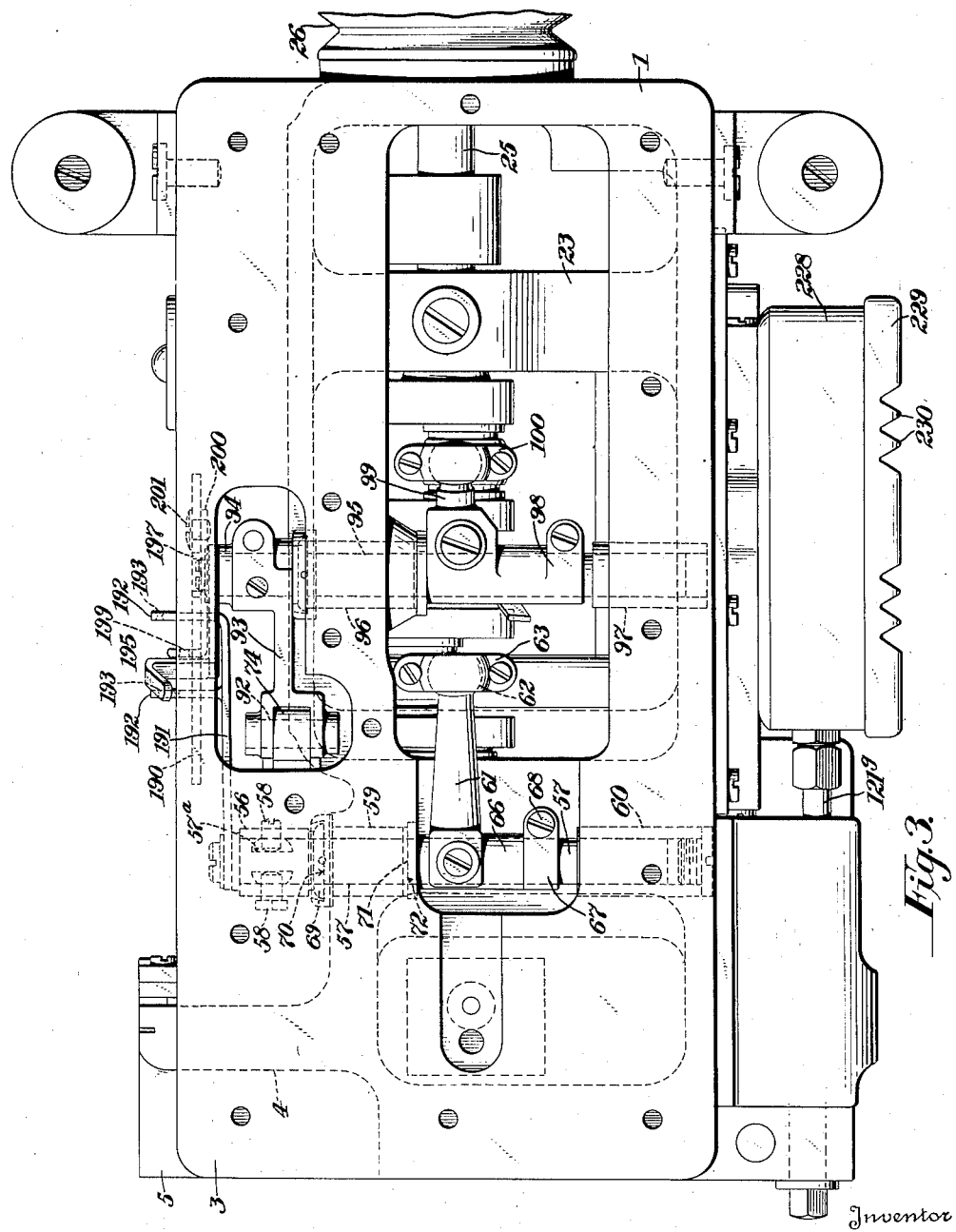

In the accompanying drawings, Fig. 1 is a front side elevation of a sewing machine embodying the invention. Fig. 1ª is a perspective view of a thread-guide-arm shown in Fig. 1. Fig. 2 is a top plan view of the machine. Fig. 3 is a bottom plan view of the machine removed from the base-plate which normally seals the bottom opening in the hollow housing in which the driving mechanisms of the machine are mainly disposed. Fig. 4 is a view similar to Fig. 1, but with certain guard and cover plates removed to expose the needle-loop-taking and overedge loopers. Fig. 5 is a detail sectional view of a part of Fig. 4. Fig. 5ª is a section on the line 5ª—5ª of Fig. 4. Fig. 6 is a longitudinal vertical section through the machine frame. Fig. 7 is a similar view through the main crank-shaft showing certain crank lubricating ducts. Fig. 8 is a left end elevation of the machine. Fig. 8ª is a section on the line 8ª—8ª of Fig. 8. Fig. 8ᵇ is a section on the line 8ᵇ—8ᵇ of Fig. 8ª. Fig. 8ᶜ is a face view of the trimmer ledger-blade and its carrier-plate. Fig. 9 is a section on the line 9—9 of Fig. 6.

Fig. 10 is a transverse vertical section through the machine frame in a plane in front of the trimming mechanism. Fig. 10ª is a section on the line 10ª—10ª of Fig. 10. Fig. 11 is a section through the trimmer-knife-carrying head at the free end of the trimmer-lever. Fig. 12 is a section on the line 12—12 of Fig. 1. Fig. 13 is a fragmentary rear side elevation of the machine showing the feed-bar-supporting fulcrum-pin and feed-lubricating duct leading from the oil-heat radiator. Fig. 14 is a transverse vertical section substantially on the line 14—14 of Fig. 6. Fig. 15 is a section substantially on the line 15—15 of Fig. 6. Fig. 16 is an elevation of the oil-gage reflecting liner. Fig. 17 is a section on the line 17—17 of Fig. 14. Fig. 18 is a transverse vertical section through the machine, showing the work-feeding mechanism in elevation. Fig. 18ª is a section on the line 18ª—18ª of Fig. 18. Fig. 18ᵇ is a perspective view of the free end of the presser-spring. Fig. 19 is a disassembled perspective view of the main and auxiliary feed-bars and their actuating connecting rods.

Figure 28:
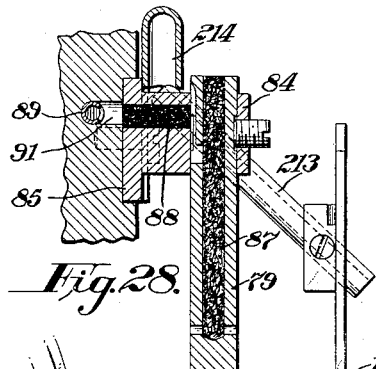
Figure 29:
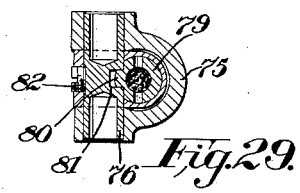

Fig. 20 is a section on the line 20—20 of Fig. 18. Fig. 21 is a perspective view of the main and auxiliary feed-dogs. Fig. 22 is a perspective view of the auxiliary feed-dog with the needle-loop-taking looper in threading position relative to the looper-thread-guiding tube. Fig. 23 is a front elevation of the looper in the position shown in Fig. 22. Fig. 23ª is a section on the line 23ª—23ª of Fig. 23. Fig. 24 is a section on the line 24—24 of Fig. 23. Fig. 25 is an elevation of the inside of the oil-heat radiator with the outside cover-plate removed. Fig. 26 is an elevation of the back mounting plate for the oil-heat-radiator. Fig. 27 is a section on the line 27—27 of Fig. 25. Fig. 28 is a section on the line 28—28 of Fig. 4. Fig. 29 is a section on the line 29—29 of Fig. 4.

Figure 31:
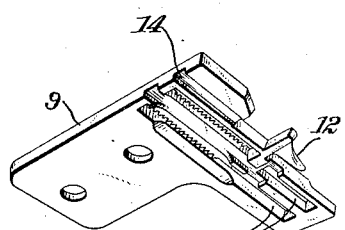
Figure 32:
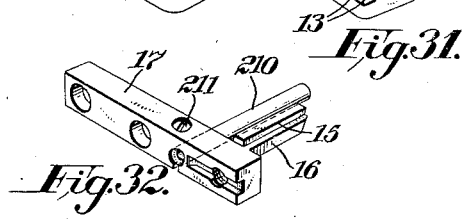
Figure 30:
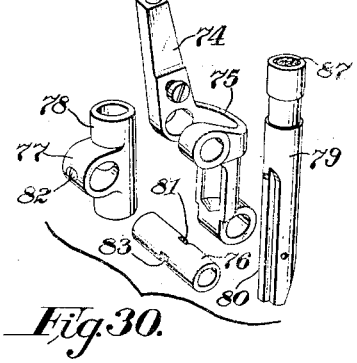
Figure 33:
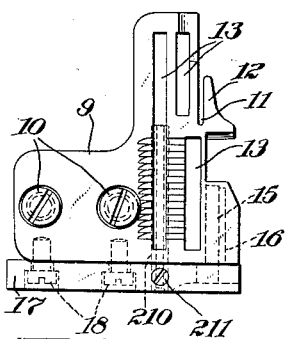

Fig. 30 is a disassembled perspective view of the overedge looper and its supporting slide-pin. Fig. 31 is a perspective view of the under side of the throat-plate of the machine. Fig. 32 is a perspective view of the upper side of the throat-plate steadying bar. Fig. 33 is a top plan view of the throat-plate superimposed upon its steadying bar; the assembly of the two parts being laterally adjustable on the supporting pedestal, and Fig.

34 is a disassembled perspective view showing the presser-foot and the elements of its hinge connection with the presser-lever.

The sewing machine is constructed with a frame including a hollow oil-tight casing or main compartment 1 closed below by means of the removable aluminum bottom plate 2. At the left end of the hollow casing 1, Figs. 1 and 4, is a base extension 3 from which rises the pedestal 4 of a work-supporting horn 5 around which tubular work may be passed for tube-end overseaming operations. The horn 5 projects away from the hollow casing 1 and the work-return space 6 thereunder is clear of mechanism. To use this horn and the space thereunder, the usual cloth-plate 7, Fig. 2, is swung to the left about its pivot 8, to an open or out-of-the-way position. The usual throat-plate 9 remains seated upon the top side of the horn 5, Fig. 2, to which it is secured for limited lateral adustment by screws 10 passing through enlarged holes in the throat-plate 9. The throat-plate 9, Fig. 33, is formed with the usual needle-clearance slot 11 and stitch-finger 12 around which the chain of stitches is formed by the stitch-forming instrumentalities in a manner well known to those skilled in the art. The throat-plate has the usual feed-dog slots 13 and has cut in its under face a groove 14, Fig. 31, which fits upon the steadying rib 15, Fig. 32, at the upper side of the arm 16 projecting in the direction of feed from the cross-bar 17 which is secured by screws 18 to a seat 19, Fig. 8, in the horn 5. The screws 18 pass through enlarged holes in the cross-bar 17 and, when loosened, permit of a limited adjustment of the bar 17 in a direction transverse to the line of feed which latter is, of course, parallel to the feed-dog slots 13 in the throat-plate 9. This provision for limited lateral adustment permits the needle-clearance slot 11 to be closely and accurately set to receive the needle 20 in its work-penetrative thrust. Because of the interfitting rib 15 and groove 14, Figs. 31, 32 and 33, the throat 9 is maintained at all times with its slots 13 in parallelism with the line of feed and, when the holding screws 10 and 18 are tightened after an adjustment, there need be no concern about alignment of the throat-plate, since proper alignment is maintained by the key-connection 14, 15 with the cross-bar 17.

Journaled in the frame bearing bushing 21, Fig. 6, and in the bushing 22 in the internal frame cross-rib 23, and also in the end ball-bearing 24, is the main shaft 25 carrying the belt-pulley and hand-wheel 26. The main shaft 25 is formed, in that portion thereof within the oil-tight casing 1 and between the bearing bushings 21, 22, with three cranks 27, 28 and 29. The shaft is also formed with the circular crank-heads 30 and 31, the outer faces of which are under-cut at 32, 33, respectively, to receive the inwardly projecting ends of the respective bushings 21 and 22. The under-cuts 32 and 33, Fig. 7, constitute oil-catching grooves which collect oil from the bearings 21 and 22 and feed it to the crank-bearings 27, 29 through the respective oil-ducts 34, 35.

Needle mechanism

The intermediate crank 28, Figs. 6 and 9, which is lubricated directly by splash lubrication, is connected by the pitman 36 to the crank-arm 37 on the hollow rock-shaft 38 journaled in the frame bearing bushing 39 and formed at its outer end with the arm 40 carrying the clamp 41 for the curved eye-pointed needle 20, Fig. 18. The crank-arm 37 is circularly adjustable upon and about the axis of the needle-carrying rock-shaft 38 which latter is formed at its inner end with cuts, Fig. 9, affording opposed shoulders 41 for the adjusting screws 42 threaded into the crank-arm hub 43 which is split at 44 and may be clamped tightly to the rock-shaft 38 by the screw 45. The axis of the opposed adjusting screws 42 is spaced to one side of the axis of the rock-shaft 38 so that, by loosening one of the screws 42 and tightening the other, the clamp-screw 45 being loosened, the rock-shaft 38 may be adjustably turned on its axis relative to the crank-arm 37 to set the limits of the needle-stroke where desired. This adjustment enables the lower limiting position of the needle to be altered to suit the thread-carrying looper which must enter a loop of thread bowed out from the needle. The pitman 36 carries the downwardly extending oil agitator 46, Fig. 9, which dips into oil in the sump 47; the oil being maintained at the oil-level o in the sump at the bottom of the oil-tight casing 1. The bearing between the rock-shaft 38, Fig. 6, and bushing 39 is lubricated by oil-mist which collects or condenses in the internal frame cut 48 and drips into the external groove 49 extending longitudinally of the bushing 39 and through the port 50 to the internal circumferential oil-distributing groove 51.

Under looper mechanism

Cooperating with the needle 20 is the under or needle-loop-taking looper 52 which, in the machine illustrated, carries a looper-thread u. The looper 52, Fig. 4, is secured in a socketed leg 53 having a foot 54 secured in the groove 55 in the hub-member 56 which is mounted on the rock-shaft 57 having the rib 57ᵃ impinged upon by the opposed adjusting screws 58, 58, Fig. 23ᵃ, whereby the hub 56 and looper 52 may be adjusted upon and circularly of the axis of the rockshaft 57. The foot 54 may be adjusted along the groove 55 in the hub-member 56 to adjust the path of the looper 52 relative to the needle. The rock-shaft 57 is journaled in the bushings 59, 60 in the frame and has fixed thereto, within the hollow frame casing, a crank-arm 61, Fig. 6, having a ball extremity 62 which is connected by the pitman 63 to the main shaft crank 27; there being a split bushing 64 between the crank 27 and the spherically socketed upper end of the pitman 63. This bushing expedient is preferably constructed substantially in accordance with the disclosure of my U. S. Patent No. 1,991,945, issued Feb. 19, 1935, and includes the internal key-disc 65 which prevents turning of the bushing within the pitman 63 but permits limited oscillation of the pitman 63 on the bushing as the pitman 63 follows the motion of the ball 62 at the end of the crank-arm 61. The hub 66, Fig. 3, of the crank-arm 61 has a split end-portion 67 which is clamped upon the rock-shaft 57 by the screw 68. The rock-shaft 57 is formed at the outer end of the bushing 59 with a thrust-collar 69 held against the recessed end face 70 of the bushing 59 by the bearing of the end of the crank-arm-hub 66 against the hardened steel washer 71 let into a recess or seat 72 in the frame casting. End play of the shaft 57 is thereby taken up.

Overedge looper mechanism

Cooperating with the under looper 52 and needle 20 is the overedge looper 73 the shank of which is secured in the socketed arm of a lever 74 including a yoked central portion 75 which is fulcrumed on the pin 76 fixed in a socketed boss 77, Fig. 30, on a sleeve 78 which is free to slide upon the rectilinear guide-pin 79 having a longitudinal rib 80 which enters the notch 81 in the fulcrum-pin 76 and keys the latter against endwise movement, so that the set-screw 82, which enters the notch 83 in the fulcrum-pin 76, is not the sole means for preventing endwise displacement of the fulcrum-pin 76. The guide-pin 79 is secured at its upper end in a socketed boss 84, Fig. 5ª, having a foot-plate 85 let into the frame casting 1 and held in place by screws 86. The guide-pin 79 is hollow and is filled by the wick 87 accessible to an oil can at the open upper end of the pin 79 for quick lubrication when the machine is started up cold. While the machine is running, the pin 79 receives oil automatically through the wick-filled duct 88 in the boss 84 fed through the oil-catching tube 89 leading from its spoon-mouth 90 in the hollow frame casing 2 to the lateral duct 91 in register with the wick-filled duct 88. The overedge looper-lever 74 is connected at its lower end by the pivot-pin 92 to the crank-arm 93 the hub 94 of which is adjustably clamped, as shown in Fig. 5, upon the outer end of a rock-shaft 95 journaled in bearing bushings 96, 97 in the frame casing 2. Clamped upon the rock-shaft 95 within the hollow frame 2 is the split hub 98 of a ball-ended arm 99 which is connected by the pitman 100 to the main shaft crank 29. The various elements of the overedge-looper driving mechanism are, in detail, like their counterparts in the under looper-driving connections and need not be further described in detail. It remains to mention the tapered wedge 101, Fig. 6, in the hub 98 of the crank-arm 99 which is pulled by the screw 102 tightly against a flat 103 on the rock-shaft 95 to prevent slippage of the hub 98 on the rock-shaft 95.

Feeding mechanism

The work-feeding mechanism is of the differential type including the main feed-dog 104 and auxiliary feed-dog 105 which are mounted, respectively, on the side-by-side main and auxiliary feed-bars 106, 107 slidably supported at their forked rear ends upon slide-blocks 108 journaled on the reduced eccentric end-portion 109, Fig. 13, of the stationary fulcrum-pin 110, rotatively adjustable in the frame pedestal 111 to vary the elevation of the feed-bar fulcrum 109. The feed-bars receive their rising-and-falling movements from the feed-lift eccentric 112, Fig. 6, on the main shaft 25; said eccentric being surrounded by the usual bearing block 113 which fits in ways 114, Fig. 19, in the feed-bars. The feed-and-return movements are imparted to the feed-bars from main and auxiliary feed-eccentrics 115, 116, removably and replaceably keyed upon the outer end of the main shaft 25 and held thereon by the nut 117. The main feed-eccentric 115 is connected by the pitman 118 to the lateral post 119 rigid with the main feed-bar 106. The auxiliary feed-eccentric 116 is connected by the pitman 120 to the lateral post 121 rigid with the auxiliary feed-bar 107. Alteration of the feed-and-return movements of the feed-dogs is effected by substitution of feed-eccentrics 115, 116 of the desired eccentricities, for those on the machine. The feed-bars 106, 107 are maintained snugly in side-by-side working relation by means of the stationary guide-bracket 121ª, Figs. 13 and 18ª, which is rigidly secured to the frame 2 by means of its horizontal cylindrical shank 121ᵇ and has at its upper edge an out-turned flange 121ᶜ faced to engage an exposed side face of one of the feed-bars. The other feed-bar is confined by the face 121ᵈ of the feed-lubricator arm 121ᵉ which is secured rigidly to the stationary feed-fulcrum pin 110. The feed-lubricator arm 121ᵉ has a pair of quick-filled ducts 121ᶠ running lengthwise thereof to pick up oil from the pipe 121ᵍ and deliver it to the main and auxiliary eccentric and pitman bearings which wipe the projecting delivery ends of the wicks 121ʰ. The pipe 121ᵍ is also wick-filled and receives oil from a special oil-heat radiator shown in Figs. 25 and 27 and to be hereinafter more particularly described. The feed-eccentrics 115, 116 and pitmans 118, 120 are protected by the removable frame-guard 121ʰ, Fig. 6, which is secured to the frame-base 3 by the screw 121ⁱ.

Trimming mechanism

The trimming mechanism comprises a stationary lower ledger-blade 122 and an upper reciprocatory trimmer-knife 123. The knife is of inverted L-shape in cross-section and is releasably held for longitudinal adjustment in the inclined groove 124, Figs. 4, 11 and 12, in the knife-head 125 by the clamping-cap 126 and screw 127. The screw 127 is threaded into a cylindrical cross-bar 128 received in a split socket 129 in the free end of the trimmer-lever 130 which fits snugly in a horizontal groove 131 in the back face of the knife head 125. The tightening of the screw 127 causes the cylinder-bar 128 to expand the split end of the trimmer-lever and grip the knife-head. When the screw 127 is loosened the knife-head 125 may be adjusted horizontally on the free end of the trimmer-lever 130 and the knife 123 may be adjusted along the inclined groove 124 in the face of the knife-head 125. The former adjustment varies the width of the trimmed edge of material from the line of needle punctures and the latter adjustment permits of compensation for shortening the knife in grinding or sharpening the latter. The trimmer-lever 130 is fulcrumed on the hollow wick-filled pin 132, Fig. 10ª, which penetrates the frame casing 2 and is exposed at its inner end to the oil mist therewithin for lubrication of the trimmer-lever fulcrum. The pin 132 is fixed in the frame by the set-screw 133. The trimmer-lever 130 is actuated by the main shaft eccentric 134 and pitman 135.

The ledger-blade 122 is releasably held for longitudinal adjustment in the inclined groove 136, Fig. 8ᶜ, in the face-plate 137 by the overhanging head 138 of the bolt 139 which passes lengthwise through the tubular neck 140 of the face-plate; said neck 140 being slidably received in a horizontal bore 141, Fig. 8ª, in the work-supporting horn 5. The bolt 139 passes through an inner sleeve 143, Fig. 8ª, which bears the thrust of the nut 142 threaded on the bolt 139 to clamp the bolt-head 138 against the ledger-blade 122.

The entire ledger-blade and its supporting assembly, including the face-plate 137, the tubular neck 140 and parts contained therein, is spring-pressed toward the trimmer-knife 123 by the spring 144 which surrounds the sleeve 143 and reacts against the stationary abutment plate 145 let into the free end of the horn 5. By means of this spring the ledger-blade 122 is maintained at all times in spring-pressed contact with the trimmer-knife 123 for effective shear-cutting action. The lateral pressure of the ledger-blade 122 against the trimmer-blade 123 caused by the spring 144 is resisted by the stationary frame-bracket 146, Fig. 4, along which the trimmer-lever moves. Cramping or side pressures of the trimmer-lever hub upon the fulcrum-pin 132 are thus avoided. The bracket 146, Fig. 4, is laterally adjustable in a horizontal guideway 147 in the machine frame 2 and is held in adjusted position against the free end of the trimmer-lever 130 by the screw 148. The trimmer-lever 130 is protected by the frame hood 149 which is secured to the casing 1 by two screws 150.

Presser mechanism

The presser-foot 151 is hingedly carried at 152 by the downturned forward free end of the presser-lever 153 which, at its rearward end, is clamped flat against the face of the upstanding arm 154 by the screw-bolt 155. The upstanding arm 154 has at its lower end a hub 156, Figs. 8, 10 and 18, which is fulcrumed on the pin 157 fixed in the frame wall 1.

The presser-lever 153 is guided in its vertical movements between the downturned end 158, Fig. 4, of a bar 159 and the angle bracket 160 secured to the bar 159; the bar 159 being secured by screws 161 to the frame hood 149. The presser-lever 153 is formed with a slot 162, Fig. 8, which is entered by a roller 163 on the free end of the cantilever presser-spring 164 the downturned rear end 165 of which, Figs. 6 and 14, is anchored in the tension boss 166 on the frame 1. The spring 164 slidably carries a ball 167 which has a depression 168 therein entered by the tip end of a presser-spring regulating screw 169 carried by the frame bracket 170. The free end of the presser-spring 164 is guided and controlled in its up-and-down movements by the slot 171, Fig. 18, in the angle-bracket 160 which receives the roller 172 on the presser-spring 164. The frame hood 149, Fig. 10, has an inclined clearance slot 173 for the presser-spring 164.

The presser-lever 153 has adjustably fixed to it a lateral stud 174 carrying a roller 175 which extends over the inclined upper edge portion 176 of a presser-lifting lever 177 fulcrumed on the screw 178 on the outside vertical wall of the hood 149 and biased by the spring 179 in a direction to carry the knee 180 of said lever into engagement with the stop ledge 181 on the hood 149. The lateral stud 174 has an eccentric shank 182, Fig. 8, so that it may be circularly adjusted to eliminate lost motion between the roller 175 and inclined edge 176. An adjustable stop-screw 183 limits the presser-lifting movement of the lever 177.

Figure 34:
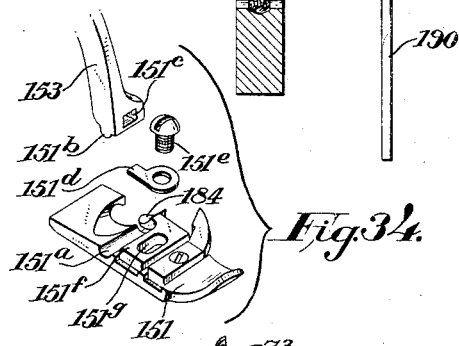

The presser-foot 151 may be adjusted as to its working position along the line of feed relative to the stitch-forming implements by loosening the clamp-screw 155 and pulling the presser-lever 153 forward or pushing it backward to the desired position, and then tightening the screw 155. This adjustment effects a slight change in the angular relation of the arm 154 and presser-lever 153 normally rigid with it. This adjustment of the presser-foot is desirable as it permits the stitch-finger 184 to be set longitudinally of the line of feed or line of stitch-formation, so that the overedge thread-loops may be laid either upon the stitch-finger 184 or directly on the work as it passes beyond the free end of the stitch-finger 184, as may be desired. The presser-hinge 152 comprises a transverse round bottomed groove 151ª, Fig. 34, in the presser-foot 151 which is entered by the round bottomed free end 151ᵇ of the presser-lever 153 having an aperture 151ᶜ therein to receive the tongue of the keeper 151ᵈ secured by the screw 151ᵉ to the shank 151ᶠ of the stitch-finger 184 which is clamped by the screw 151ᵉ in a transverse groove in the presser-foot. The stitch-finger 184 is adjustable laterally of the presser-foot as it has a clearance slot 151ᵍ therein for the clamp-screw 151ᵉ.

Thread-controlling mechanism

The thread-controlling mechanism of the present machine will be covered in a separate application. The needle-thread t, Figs. 2 and 6, runs from the supply through the tension device 185 and thence through the guide-tube 186 and through the guide-eye 187 at the end of the arm 188 on the end of the guide-tube 186 to the needle 20. The needle-clamp has a V-shaped notch 189, Figs. 1, 4 and 6 which, when the needle nears the lower end of its stroke, engages and bends forwardly the length of thread between the thread-eye 188 and the needle and acts as a stitch-tightener and pull-off. The action of this pull-off notch 189 is increased or decreased by rotative adjustment of the thread-guide arm 187 and its carrier tube 186, thus positioning the thread-eye forwardly or backwardly, as desired, and lessening or increasing the pull-off action of the V-shaped notch 189 on the needle-thread t.

The under and overedge looper-threads are controlled by devices working through the slotted plate 190, Fig. 1, at the front of the machine. Fixed to the front end of the under looper rock-shaft 57, Fig. 3, is an arm 191 having at its free end two spaced forwardly extending arms 192 which pass through the slotted plate 190 and have accessible thread-eyes 193 therein. Fixed to the front end of the overedge-looper-actuating rock-shaft 95, Figs. 1 and 3, is thread-take-up arm 194 which is formed at its free end with a forwardly and downwardly extending hook 195 projecting through one of the slots in the plate 190 and positioned between the spaced take-up arms 192 carried by the under looper rock-shaft 57. Mounted in a circular aperture 196, in the front plate 190, coaxial with the rock-shaft 95, is the hub 197, Fig. 1ª, of an arm 198 having at its free laterally extended end a thread-eye 199 which is disposed between the thread-eyes 193 adjacent the hook 195. The arm 198 has a tailpiece 200 which is threaded to receive a clamping screw 201 passing through an enlarged opening 202 in the plate 190 to permit of a limited circular adjustment of the stationary thread-eye 199 about the axis of the rock-shaft 95. The plate 190 is vertically slotted at 203 to pass the thread-guide stud 204 which is carried by the plate 205 into which the clamp-screw 206 is threaded; said screw 206 passing through the vertical slot 203. The thread-guide stud 204 is thus adjustable up and down the slot 203.

The under looper-thread u runs from the supply through the tension-device 207, Fig. 1, and stationary thread-guide 204, thence through both of the thread-eyes 193 and under the hook 195 therebetween. The thread u then runs horizontally through the guide-tube 208 and vertically in the guide-slot 209 in the front face of the pedestal 4 and horn 5 to the guide-tube 210 through which the thread runs to the eye of the under looper 52. The guide-tube 210 is held in the bar 17, Figs. 23 and 24, by the set-screw 211 and is rotatively adjustable about its longitudinal axis to present an ungrooved end-portion of the tube to the looper-thread u which tends to saw a groove in the delivery end of the tube 210. As shown in Figs. 22 and 23, the tube 210 terminates close to and in register with the eye of the under looper 52 when the latter is in its fully retracted position. This condition facilitates threading the under looper.

The overedge looper-thread $v$, Fig. 1, runs from the supply through the tension-device 212 and guide 212' to and through the eye 199 in the adjustable guide-arm 198 and under the hook 195 to and through the adjacent movable eye 193 and up through the thread-tube 213 and under the inverted U-shaped sheet metal thread-guard 214 to the eye of the overedge looper 73.

The timing of the rock-shafts 57 and 95 is such that the eyes 193, moving with the former, are rising as the hook 195, moving with the latter, is falling. This opposed action of the eyes 193 and hook 195 subjects the threads $u$ and $v$ to a thread-tightening action which occurs while the needle is nearing the lower end of its stroke and after the retracting looper 52 has shed the needle-thread loop and after the overedge looper 73 has backed out of or shed the under looper-thread loop. Thus, the several shed loops are drawn up or tightened, substantially simultaneously, around one or both of the superposed stitch-fingers 12 and 184 on the throat-plate and presser-foot, respectively, as desired.

Although both under threads $u$ and $v$ are handled by the moving arm 191, acting in conjunction with the moving thread-hook 195, the two threads are not treated equally. The provision of the circularly adjustable thread-guide 198 for the overedge thread $v$, and the vertically adjustable thread-guide 204 for the under looper-thread $u$ enables the operator to vary the control of either thread $u$ or $v$ independently of the other.

Oil-heat radiator

The hollow frame casing or main compartment 1 has a large window 215, Fig. 4, in its front face for access to the working parts within the casing 1. This window is normally closed oil-tight by the plate 216, Figs. 1, 2 and 14. Below the plate 216 is an oil sight gauge comprising a transparent window-disk 217 of cellulose acetate thermo-plastic material or other suitable transparent plastic material insoluble in oil, having a forwardly bulging diametrical portion 218 projecting through a diametrical slot in a clamping plate 219 secured by screws 220 to a recessed circular seat 221, Figs. 14 and 17, in the base-portion of the frame casing 1. Between the plate 219 and seat 221 are interposed a white reflector sheet 222, Figs. 16 and 17, and a gasket 223. The reflector sheet is apertured for the four screws 220 and is further apertured at 224 and 225 in register with the respective ports 226 and 227 leading into the oil-chamber in the casing 1. The gasket 223 is diametrically slotted to expose the white sheet reflector 222 back of the bulged portion 218 of the oil gauge window 217. The oil level $o$ should be maintained at the halfway mark in the gauge.

On the rear wall of the casing or main compartment 1 is mounted the oil-heat radiating sub-compartment 228 which is preferably a cast aluminum alloy box-like member closed at its rear side by the removable plate 229 formed with heat-radiating ribs or fins 230. It will be seen in Fig. 14 that the radiator box 228, 229 constitutes oil-storage means disposed practically wholly above the oil level $o$ in the casing 1. Also, the box 228, 229 is spaced away from the rear wall of the frame casing 1 to permit circulation of air therebetween. This spacing is provided by screwing the box 228, 229 to a spacer-bar 231 which is itself screwed at 232, Figs. 2 and 27, to the frame casing rear wall. The box cover 229 and the box 228 are secured together and to the spacer-bar 231 by the three long screws 233. Additional cover screws are provided at 223', Fig. 27, along the lower edge of the cover 229.

The box 228 has fixed in apertures in the wall thereof adjacent the machine, the horizontal spoon-mouthed oil-catching inlet tubes 234, 235, which extend through the spacer-bar 232 into the oil-splash cavity within the frame casing 1. Mounted within the oil-splash cavity in the casing 1 is the oil-spray-catching shelf or shallow trough 236, Figs. 2, 4 and 27, which is disposed horizontally and drains at its opposite ends into the spoon mouths of the oil-inlet tubes 234, 235.

The box 228 is formed internally with end lugs 237, Figs. 25 and 27, bored vertically to provide ducts 238 to conduct the heated incoming oil from the tubes 234, 235 to the bottom of the box and discharge the heated incoming oil into the bottom of the box from whence it will rise and mix with the cooler oil already in the box and be cooled thereby. The box 228 is formed with oil-overflow or oil-return holes 239 which register with similar holes in the spacer-bar 231 and rear wall of the frame casing 1 and allow cooled oil from the heat-radiator box 228 to flow back into the casing 1 and return to the sump at the bottom of the latter.

The box 228 is formed below the outflow holes 239 with a port 240 leading through the registering port 241 in the spacer-bar 231 to the ports 242 and 243 running lengthwise of the spacer-bar 231 and connecting, respectively, with the ports 244 and 245, Fig. 6, leading to the main shaft bearings 22 and 21. The feed-lubricating pipe 121$^{s}$, previously described, enters one end wall of the radiator box 228 below the level of the inlet pipe 234, Fig. 27, and intersects the port 238, receiving oil from the spoon-mouthed inlet pipe 234.

Oil from the feed eccentrics and trimming mechanism, Fig. 6, gravitates to and collects in the oil-pocket 246 in the base-extension 3 and filters through the screen 247 into the port 248 leading to the felt pad 249 in a pocket 250 in communication with the oil-sump within the casing 1.

The loopers 52, 73 and their respective carrier levers 53, 74, are guarded in their movements by the removable front guard-plate 251, Fig. 1, which is secured by screws 252, 253, respectively, to the trimmer-lever guide-block 146 and to one edge of the thread-controller guard-plate 190.

The edge of the work, after passing the needle 20, is guarded by the trough-shaped guard-plate 254, Figs. 6 and 18, secured by screws 255 to the hood 149.

As shown, the present machine is a three-thread overedge sewing machine; the under looper 52 and overedge looper 73 each being a threaded or eye-pointed looper. It will be understood by those skilled in the art, however, that appropriate non-threaded loopers may be substituted for either or both of the loopers 52, 73 shown, to sew either a two-thread overedge seam or a single-thread overedge seam; such substitutions being commonly practiced in overedge sewing machines.

Having thus set forth the nature of the invention, what I claim herein is:

1. An overedge sewing machine having a frame including an oil-tight casing, and a work-supporting horn at one end of said casing, a main shaft journaled in oil-tight bearings in said casing, a needle, a needle-throat-plate carried by said horn, means including a shaft passing through an oil-tight bearing in a wall of said casing for actuating said needle, an under-looper-carrying rock-shaft passing through a wall of said casing and disposed below and transverse to said main shaft, an overedge looper, an overedge-looper-actuating rock-shaft passing through a wall of said casing and disposed below and transverse to said main shaft, operative connections between each of said rock-shafts and said main shaft within said casing, said rock-shafts being both disposed at the same side of the vertical plane of action of the needle containing the line of seam-formation.

2. An overedge sewing machine having a frame, including an oil-tight casing and a work-supporting horn at one end of said casing, a main shaft journaled in oil-tight bearings in said casing and having three cranks within said casing, a needle-actuating rock-shaft passing through a wall of said casing and disposed in parallelism with and above the main shaft, a needle actuated by said rock-shaft, an under looper, an under-looper-carrying rock-shaft passing through a wall of said casing and disposed below and transverse to said main shaft, an overedge looper, an overedge-looper-actuating rock-shaft passing through a wall of said casing and disposed below and transverse to said main shaft, each of said rock-shafts being connected to a respective one of said cranks within said casing, and all of said rock-shafts being disposed at the same side of the vertical plane of action of the needle containing the line of seam-formation.

3. An overedge sewing machine having, in combination, a frame including a work-support formed with a laterally projecting horn around which tubular work may be passed for a tube-end overseaming operation, said frame also including a hollow housing disposed mainly at that side of the machine frame as a whole from which said horn projects, a main shaft journaled in said frame and including three cranks in said hollow housing, an eye-pointed needle connected to be actuated by one of said cranks, a looper connected to be operated by another of said cranks, and an overedge implement connected to be operated by the third one of said cranks, said needle, looper, overedge implement and their crank-driven connections being mounted and supported mainly at the side of the line of seam formation excluding the work-supporting horn so that they do not interfere in any manner with the handling of tubular work.

4. An overedge sewing machine having, in combination, a frame including a work-support, a work-feeding element, a main shaft journaled in said frame below the level of said work-support and connected to operate said work-feeding element, said shaft having three cranks therein at the same side of the line of feed of the machine, an eye-pointed needle connected to be operated by one of said cranks, a pivotally mounted needle-loop-taking looper connected to be operated by another of said cranks, and an overedge looper connected to be operated by the third one of said cranks, the pivotal mounting of said needle-loop-taking looper as well as all of said operating connections for said loopers being disposed at the same side of the line of feed as said cranks.

5. In an overedge sewing machine, a slide-block, a rectilinear guide-rod for said slide-block, a lever pivoted between its ends to said slide-block, an overedge looper mounted at one end of said lever, a vibratory crank pivotally connected to the other end of said lever, and means to vibrate said crank.

6. In an overedge sewing machine, an overedge looper in the form of a lever, a carrier on which said lever is pivotally mounted, a rectilinear guide-rod on which said carrier is bodily slidable, a vibratory crank pivotally connected to said lever, and means to vibrate said crank.

7. In an overedge sewing machine, an overedge looper in the form of a lever, a carrier on which said lever is pivotally mounted, a rectilinear guide-rod on which said carrier is bodily slidable, a crank pivotally connected to said lever, a rock-shaft carrying said crank, a main shaft, a crank thereon, and a pitman connection between said last mentioned crank and said rock-shaft.

8. In an overedge sewing machine having stitch-forming mechanism including an overedge implement, feeding mechanism and a presser-foot carrying a stitch-finger, the improvement which consists in mounting the presser-foot for adjustment lengthwise of the line of feed to enable the stitch-finger to be positioned under or in front of the thread laid by the overedge implement.

9. In an overedge sewing machine having stitch-forming mechanism including a needle, an under looper and an overedge looper, feeding mechanism, and a pivoted presser-lever carrying a presser-foot having a laterally adjustable stitch-finger, the improvement which consists in making the presser-lever in two relatively adjustable sections, whereby the presser-foot may be bodily adjusted lengthwise of the line of feed, to enable the overedge stitches to be laid upon the stitch-finger or directly upon the work passing out from under the stitch-finger, as may be desired.

10. In an overedge sewing machine having stitch-forming mechanism including a needle, an under looper and an overedge looper, feeding mechanism, and a pivoted presser-lever carrying a presser-foot having a laterally adjustable stitch-finger, the improvement which consists in making the presser-lever of two angularly related pivotally connected sections which are adjustable as to their angular relationship to vary the position of the presser-foot and its stitch-finger lengthwise of the line of feed.

NICHOLAUS KNAUS.